United States Patent [19]

Bleth et al.

[11] Patent Number: 4,690,179
[45] Date of Patent: Sep. 1, 1987

[54] FLUID INDUCTOR AND METERING DEVICE AND METHOD OF USE

[76] Inventors: Joel J. Bleth, 928 9th East; Williard R. Tormaschy, 819 8th Ave. West, both of Dickinson, N. Dak. 58601

[21] Appl. No.: 932,919

[22] Filed: Nov. 19, 1986

[51] Int. Cl.⁴ .......................... B65B 3/00; F16K 31/02
[52] U.S. Cl. ........................................... 141/1; 141/37; 141/65; 141/98; 141/104; 137/625.15; 137/888; 137/625.46; 137/625.21
[58] Field of Search ..................... 141/1, 98, 4, 5, 37, 141/47, 100, 104, 236, 65; 137/625.47, 625.46, 625.31, 625.32, 625.2, 625.21, 625.22, 625.28, 625.29, 625.12, 625.13, 625.15, 625.16, 625.18, 888, 889; 366/162

[56] References Cited

U.S. PATENT DOCUMENTS

| | | | |
|---|---|---|---|
| 1,025,517 | 5/1912 | Davis | 137/625.22 |
| 2,833,151 | 5/1958 | Harvey | 137/625.47 |
| 3,939,871 | 2/1976 | Dickson | 137/625.47 |
| 4,171,710 | 10/1979 | Boynton et al. | 141/104 |
| 4,286,624 | 9/1981 | Clausen et al. | 137/625.19 |
| 4,431,161 | 2/1984 | Miller et al. | 137/625.46 X |
| 4,614,204 | 9/1986 | Dolejs | 137/625.46 X |

Primary Examiner—Charles E. Phillips
Assistant Examiner—Ernest G. Cusick
Attorney, Agent, or Firm—W. Scott Carson

[57] ABSTRACT

Fluid inductor and metering device for handling and mixing concentrated chemicals such as herbicides and pesticides. In one mode of operation, the concentrated chemicals are first drawn by a transfer pump from their storage container or containers into a graduated chamber and thereafter added into a primary water flow in a metered manner. In addition to being operable in a batching manner, the apparatus of the present invention can also be used to continuously inject the concentrated chemicals into the primary water flow directly from their storage containers as well as to back flush water through the storage containers to clean them. In the preferred embodiment, all of these operations can be accomplished using only the force of one transfer pump and by the manipulation of a single valve member.

38 Claims, 19 Drawing Figures

FLUID INDUCTOR AND METERING DEVICE AND METHOD OF USE

BACKGROUND OF THE INVENTION

1. Field of the Invention

This invention relates to the field of fluid inductors and more specifically to the field of fluid inductors primarily intended for use in handling chemical herbicides and pesticides for agricultural use.

2. Background Discussion

Chemical herbicides and pesticides are widely used by farmers throughout the world. In a typical manner of operation, the chemicals are purchased by the farmer in a concentrated form and then diluted in the field just prior to spraying them on the crops.

Handling the concentrated chemicals in the field has always been a problem for the farmer and with the increased toxicity and corrosiveness of today's chemicals, this problem has become one of major concern. This concern is not only for the short term health effects of such exposure including burns and accidental poisoning but also for the long term effects including cancer. For example, a recent study by the National Cancer Institute and University of Kansas reports that farmers who were exposed to herbicides twenty days a year or more were six times more likely to contract certain cancer than people who did not work with such chemicals. This study also reported that the risk to farmers who actually mixed or applied the chemicals increased eightfold.

In one of the most commonly used spraying techniques, the farmer has a large storage or nurse tank of water in the field from which he periodically fills a smaller sprayer tank mounted on a pickup truck. In doing so, the concentrated chemicals are either added directly to the sprayer tank or added to the water as it is pumped from the nurse tank to the truck-mounted sprayer tank. Adding the chemicals directly to the sprayer tank with a hand pump or by manually measuring and dumping the chemicals into the tank are perhaps the oldest and, understandably in view of the health risks, the least popular methods. Further, if a hand pump or any other mechanical pump is used, the additional problem arises that the pump may become contaminated by the chemicals passing through it and become unsuitable for any other use around the farm where the chemical residue may be harmful. In this light, an increasingly popular method of handling the chemicals is to connect a funnel-shaped, graduated tank to the suction side of the water transfer pump between the nurse and sprayer tanks. The graduated tank is typically rather large and need not be filled as often as when the chemicals are added directly into the sprayer tank. Nevertheless, it still must be filled as in the prior methods either by hand or by a separate pump. As in the prior methods, this can result in dangerous exposure to the chemicals and contamination of the pump. Additionally, the graduated tank is typically mounted on the pickup truck with the sprayer tank and because of its relatively large size, it often can be difficult to accurately read the amount of chemicals being dispensed particularly if the truck is not level as commonly is the case in the field.

Another popular method for adding the concentrated chemicals to the water as it flows between the nurse and sprayer tanks is to connect a metered line to the suction side of the pump. The concentrated chemicals are then drawn directly through the meter into the water flow. This direct and continuous feed technique helps avoid potentially harmful exposure to the chemicals but it has several practical drawbacks. For example, the metered line is connected to the suction side of the pump in order to utilize the pump vacuum but in doing so, the chemicals then pass through and contaminate the pump. Additionally, volumetric meters which are very accurate are also very expensive and if cheaper, turbine-style meters are used, accuracy often then becomes a serious problem particularly due to viscosity differences between chemicals and even with the same chemical at different temperatures during the day. Also, turbine-style meters usually have minimum and maximum flow ranges that must be followed thus complicating the overall process and leading to possible operator error.

With these problems in mind, the present invention was developed. With the present invention, concentrated chemicals can be accurately added to the primary water flow downstream of the transfer pump between the nurse and sprayer tanks. In doing so, the chemicals do not pass through the transfer pump and, therefore, do not contaminate it. Further, no additional pump is necessary as the force of the transfer pump is used not only to transfer the water from the nurse tank to the sprayer tank but also to alternately load and unload a graduated or measuring chamber with the concentrated chemical. In addition to this batching manner of operation, the present invention can also be used to continuously inject the concentrated chemicals into the water flow directly from the storage container as well as to back flush water into the storage container for cleaning purposes. In the preferred embodiment, all of these operations can be easily and quickly performed using only the force of the single transfer pump and by manipulation of a single valve.

SUMMARY OF THE INVENTION

This invention involves a method and apparatus for handling and mixing concentrated chemicals such as herbicides and pesticides. In the preferred embodiment, the concentrated chemicals are first drawn by a transfer pump from their storage container or containers into a graduated chamber. Thereafter, the same pump is then used to add the concentrated chemicals from the chamber into a primary water flow in a metered manner. In doing so, the transfer pump is preferably positioned between a relatively large storage or nurse tank of water and a truck-mounted sprayer tank with the graduated or measuring chamber connected to the water line downstream of the pump so as not to contaminate it. In addition to being operable in a batching manner, the apparatus of the present invention can also be used to continuously inject the concentrated chemicals into the primary water flow directly from their storage containers as well as to back flush water through the storage containers to clean them. In the preferred embodiment, all of these operations can be accomplished using only the force of one transfer pump and by the manipulation of a single valve member. Further, all of the operations can be done without contaminating the pump and without unduly exposuring the operator to the potentially harmful chemicals.

DETAILED DESCRIPTION OF THE PREFERRED EMBODIMENTS

Figure 1:
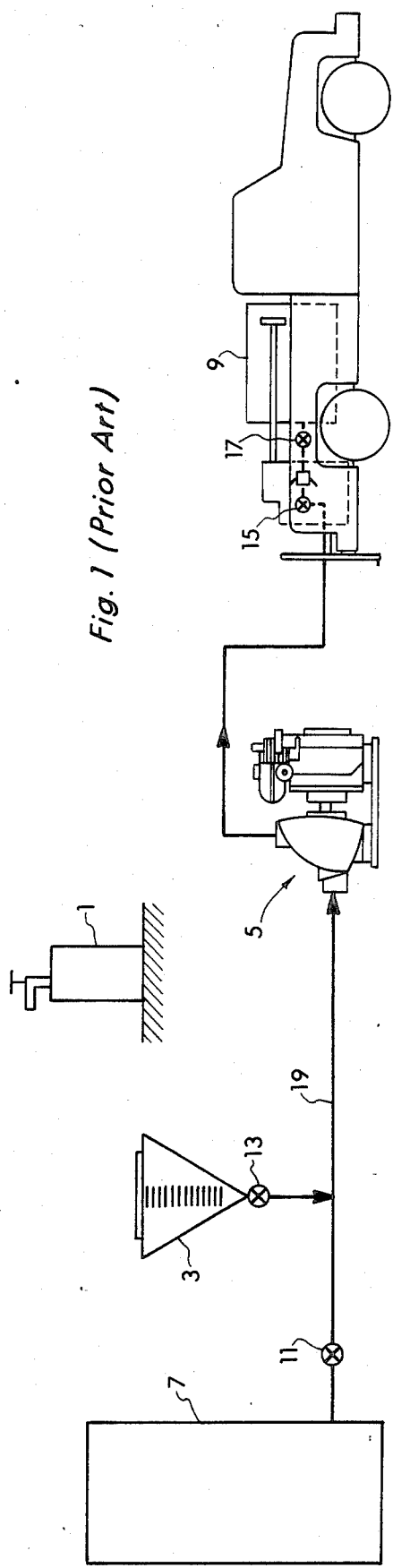
FIGS. 1 and 2 schematically illustrate prior art approaches for handling herbicides and pesticides in the field.
Figure 2:
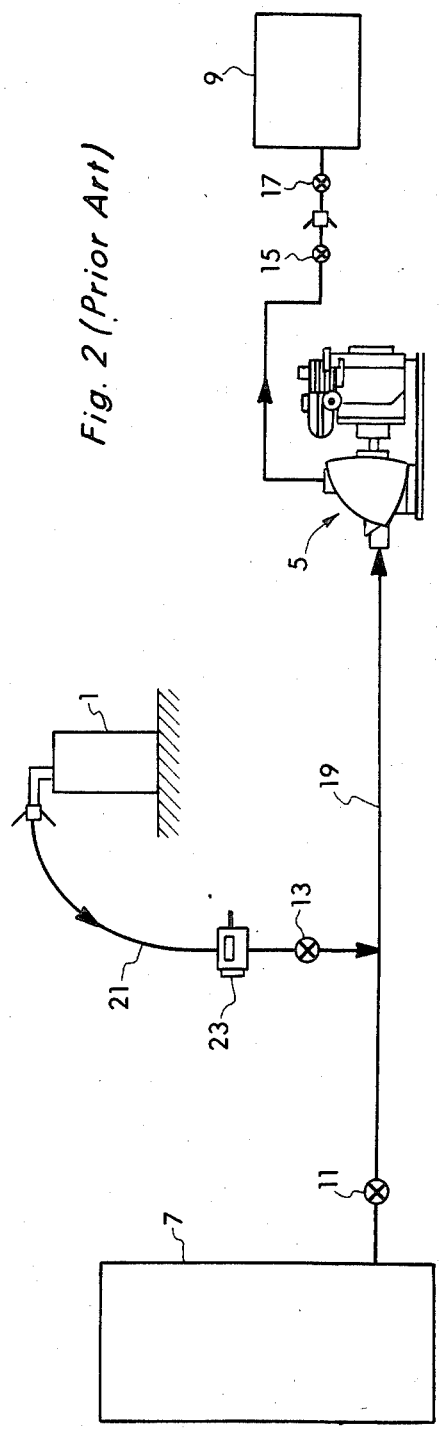

FIGS. 1 and 2 illustrate two commonly used methods for handling liquid herbicides and pesticides in the field. In the apparatus of FIG. 1, concentrated liquid chemicals in the storage container 1 are manually poured into the measuring chamber 3. Thereafter, the pump 5 is then activated to periodically transfer water as needed from the large storage or nurse tank 7 to the truck-mounted sprayer tank 9. In doing so, valves 11, 13, 15, and 17 are opened and manipulated to add the concentrated liquid chemical from the chamber 3 into the primary flow of the main conduit line 19 in the desired proportions. This prior art approach can unfortunately result in potentially harmful exposure to the chemicals being handled. In a simpler variation of the approach of FIG. 1, the operator can merely pour the concentrated chemicals from the container 1 directly into the sprayer tank 9 but this technique can also result in potentially harmful exposure to the chemicals. In yet another modified approach to the one of FIG. 1, an auxiliary pump is sometimes used to transfer the concentrated chemicals from the storage container 1 to the chamber 3 in an attempt to reduce the exposure; however, the auxiliary pump then becomes contaminated and unsuitable for other uses around the farm.

In the prior art approach of FIG. 2, a metered line 21 is used to transfer the concentrated liquid chemicals from the storage container 1 to the main line 19. This technique can help to limit potentially harmful exposure to the chemicals but if a volumetric meter such as 23 is used, it can be very expensive and if a less costly turbine-style meter is used, significant accuracy problems can occur. Further, turbine-style meters usually have minimum and maximum flow ranges that must be followed thus complicating the overall process and leading to possible operator error. Additionally, both the prior art approaches of FIGS. 1 and 2 have the fundamental problem that the concentrated chemicals are added upstream of the transfer pump 5 and, therefore, contaminate it.

Figure 3:
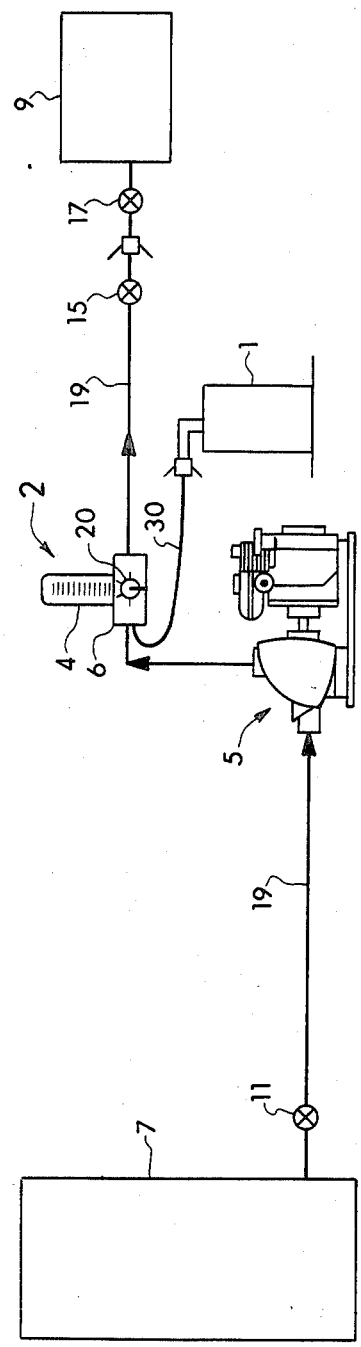
FIG. 3 schematically illustrates the apparatus of the present invention.

In contrast to such prior art approaches, the apparatus 2 of the present invention as shown in FIG. 3 adds the concentrated liquid chemicals from the remote storage container 1 through the line 30 to the primary flow of water in line 19 downstream of the transfer pump 5. Additionally and more importantly, it does so in an accurate and substantially closed manner to minimize potentially harmful exposure of the operator to the chemicals. Further, the apparatus 2 of the present invention uses only the existing force of the transfer pump 5 to alternately load and unload the measuring chamber 4 as well as to bypass measuring chamber 4 so that the concentrated chemicals can be fed directly and continuously if desired into the main line 19 and to back flush the feeding line 30 and container 1 with water to clean them. All of these operations in the preferred embodiment of the present invention can be done without unduly exposing the operator to the potentially harmful chemical and by the easy manipulation of a single valve member 20.

Figure 4:
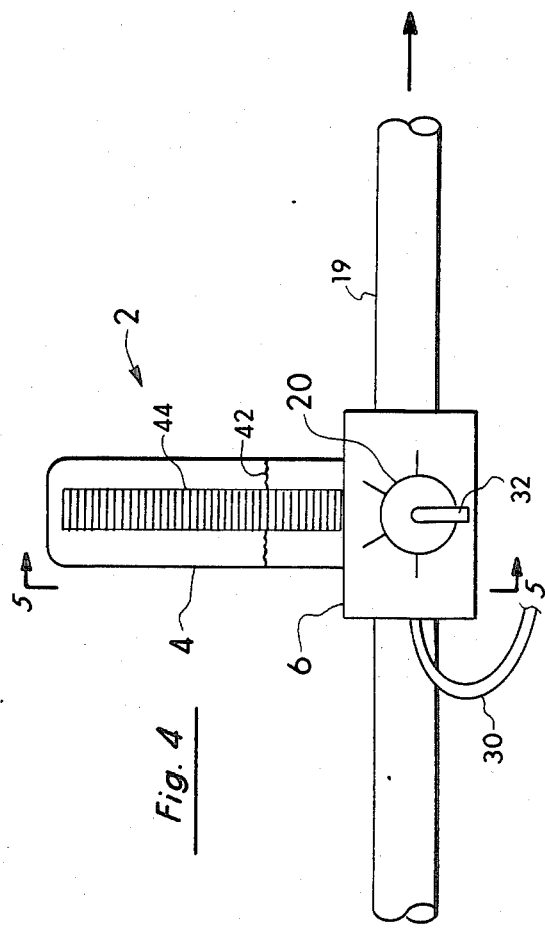
FIG. 4 is an enlarged view of the measuring or graduated chamber and control manifold of the present invention.
Figure 5:
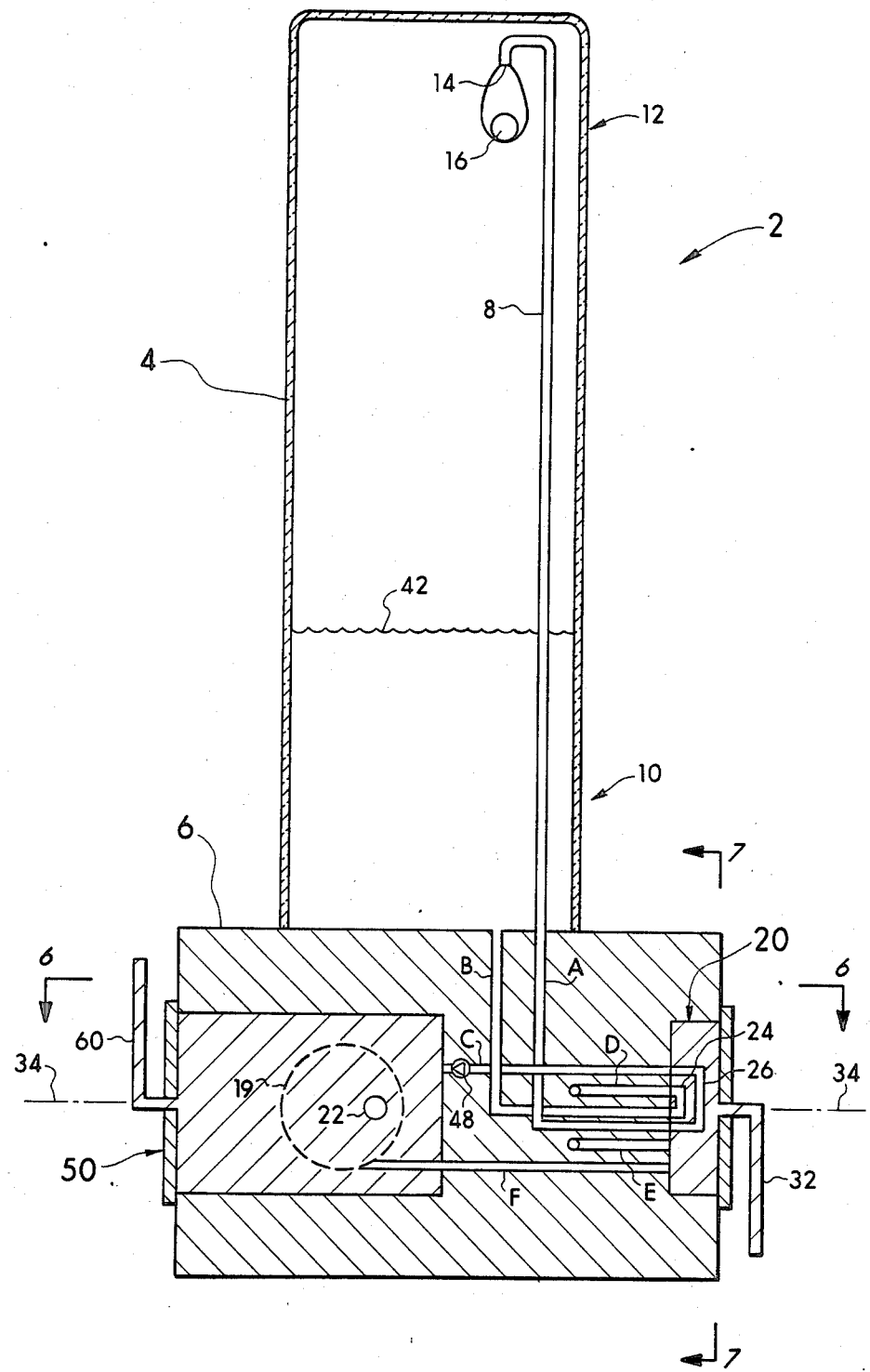
FIG. 5 is a schematic view of the measuring chamber and flow lines associated with it taken generally along line 5—5 of FIG. 4.

Referring to FIG. 4, the apparatus 2 of the present invention includes measuring chamber 4 and control manifold 6. As best seen in FIG. 5, the measuring chamber 4 is mounted atop the manifold 6 with a standing pipe 8 extending vertically substantially from the lower portion 10 of the chamber 4 to the upper portion 12. The open end 14 at the top of the pipe 8 has a caged float valve 16 mounted to it and the pipe 8 connects with a flow line A that extends through the manifold 6 to the control valve member 20. Additionally, as shown in FIG. 5, the manifold 6 has a flow line B leading from the lower portion 10 of the chamber 4 to the valve member 20 and a flow line C between the valve member 20 and the venturi 22 in the main or primary flow line 19 (see FIGS. 5 and 6). Referring again to FIG. 5, the manifold 6 also has a line D leading from the control valve member 20 to the remote storage container 1 for the concentrated liquid chemicals, line E leading from the control valve member 20 to air at ambient air pressure, and line F from the valve member 20 to a position upstream of the venturi 22 in the main flow line 19 (see FIG. 6).

Figure 6:
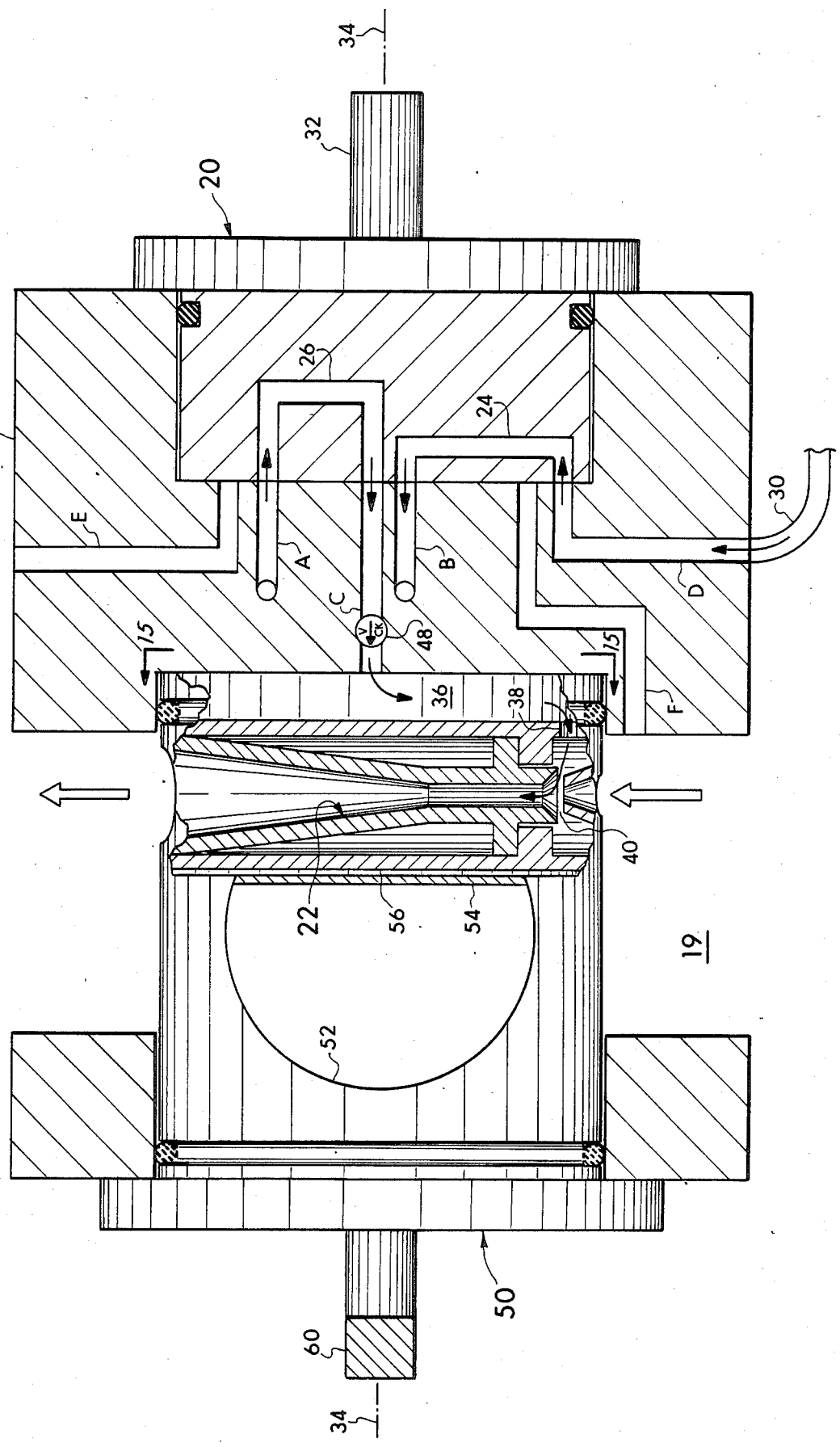
FIG. 6 is a schematic view taken generally along line 6—6 of FIG. 5.
Figure 7:
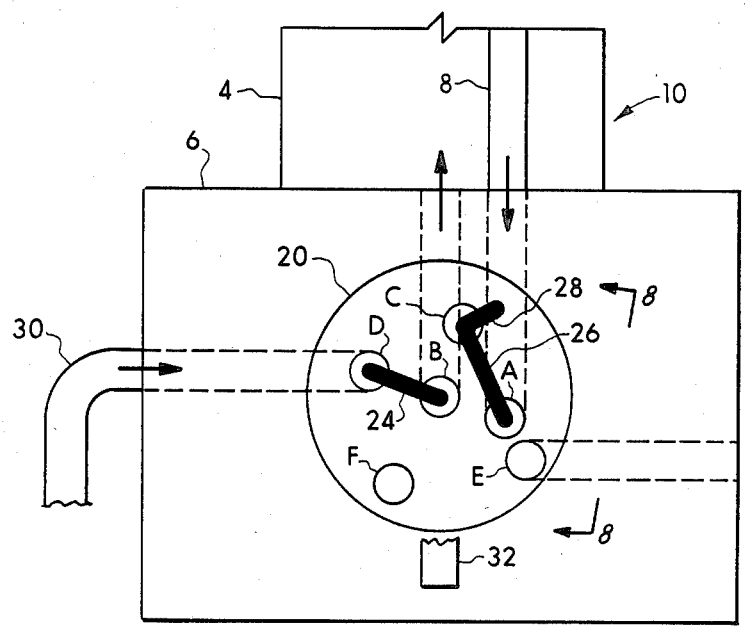
FIG. 7 is a schematic view taken generally along line 7—7 of FIG. 6 showing the measuring chamber and flow lines with the control valve set to fill the chamber.
Figure 8:
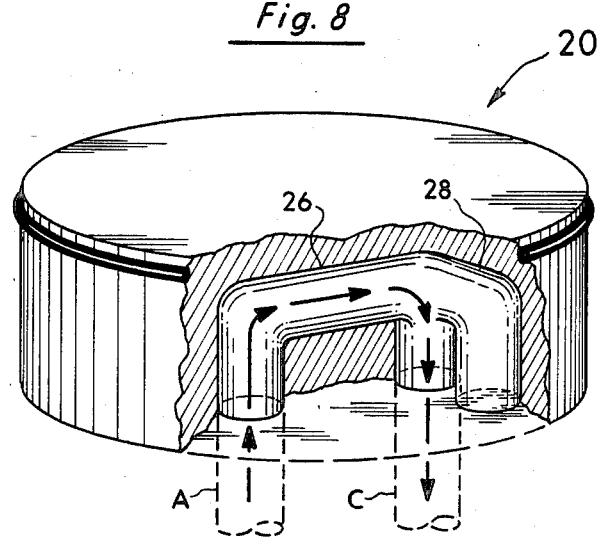
FIG. 8 is a perspective view of the control valve taken generally along line 8—8 of FIG. 7 showing one of the connecting flow passages through it.

In the preferred embodiment of the present invention, the control valve 20 has three flow passages 24, 26, and 28 in it (see FIGS. 5, 6, and 8). In this embodiment, flow passage 24 is separate but flow passages 26 and 28 are interconnected in a dog leg fashion as best shown in FIG. 8. In operation, the control valve member 20 can be rotated by manipulation of the handle 32 about the axis 34 to the position of FIGS. 5-7 to fill the measuring chamber 4 with concentrated liquid chemicals from the remote storage container 1 which is under ambient air pressure. In doing so, the primary flow of water through the conduit line 19 from the location of the nurse tank 7 to the location of the sprayer tank 9 is transferred under the force of the pump 5 (see FIGS. 3 and 4) through the venturi 22 in FIG. 6. This creates an area of reduced pressure (less than ambient air pressure) in the primary flow at the venturi 22 and serves to draw a vacuum in line C which connects by chamber 36 (see FIG. 6) and port holes 38 and 40 to the reduced pressure of the venturi 22. With the control valve member 20 so positioned as shown in FIGS. 5-7, the vacuum in line C connects with valve passage 26 (see FIG. 5), line A, and standing pipe 8 to draw air out of the upper portion 12 of the chamber 4 through this first flow path of C, 26, A, and 8. As the measuring chamber 4 is being evacuated, concentrated liquid chemical from the remote storage container 1 is then drawn through a second flow path of 30, D, 24, and B into the lower portion 10 of the chamber 4. Thereafter, as the level 42 (see FIG. 5) of concentrated liquid chemical rises in the chamber 4, it can be monitored by the graduations 44 of the chamber 4 (see FIG. 4) and manually shut off as desired by manipulation of the valve member 20. Alternately, the float valve 16 (see FIG. 5) can be left to automatically shut off the flow as the liquid level 42 reaches the open end 14 of the pipe 8. At this point, it is noted that the smaller dog leg portion 28 of the valve flow passages 26 and 28 is shown in FIGS. 7 and 8 but in this position, it does not interconnect any of the lines A-F.

Figure 9:
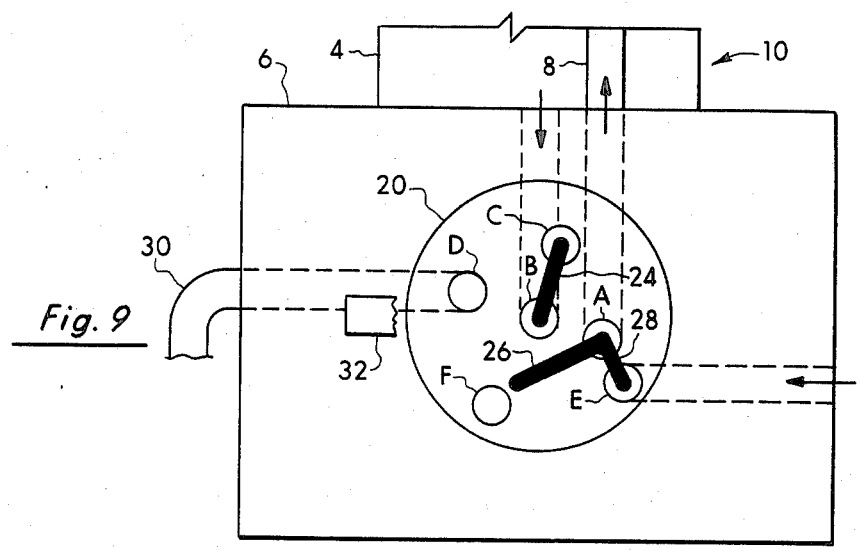
FIG. 9 illustrates the apparatus set to empty the measuring chamber into the primary flow.

Referring again to FIGS. 5-7 and once the desired amount or batching of concentrated liquid chemical has been drawn into the measuring chamber 4, the control valve member 20 can then be rotated to the position of FIG. 9. In this position, lines C, 24, and B form a third flow path and lines E, 28, A, and 8 form a fourth flow path. In doing so, the first and second flow paths are closed by the valve 20 and with the third and fourth flow paths open, the concentrated liquid chemical in the measuring chamber 4 is then drawn under the force of the venturi 22 out of the lower portion 10 of the chamber 4 through the third flow path (i.e., B, 24, and C) as ambient air fills the chamber 4 through the fourth flow path (i.e., E, 28, A, and 8). As shown in FIG. 9, the larger dog leg portion 26 of the valve flow passages 26 and 28 does not interconnect any of the lines A-F at this time.

Figure 10:
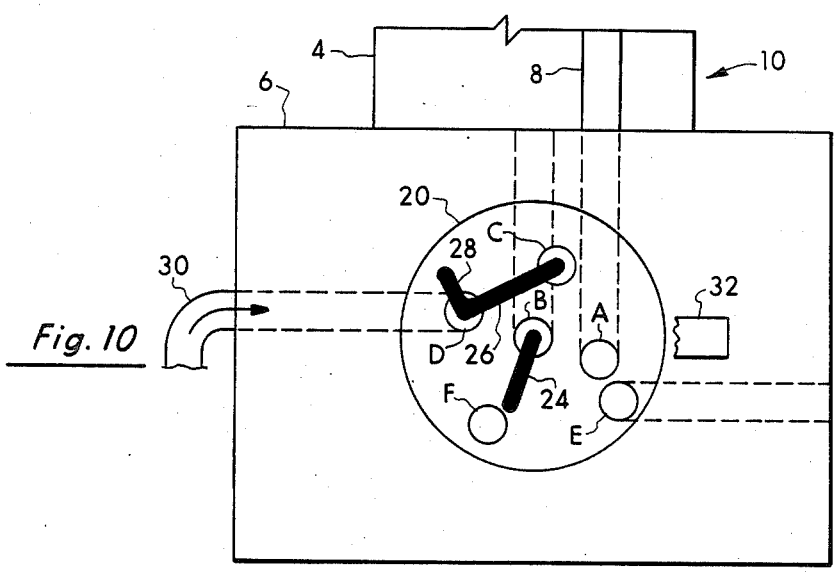
FIG. 10 illustrates the apparatus set to continuously feed the liquid herbicides and pesticides directly from their storage container into the primary flow.
Figure 11:
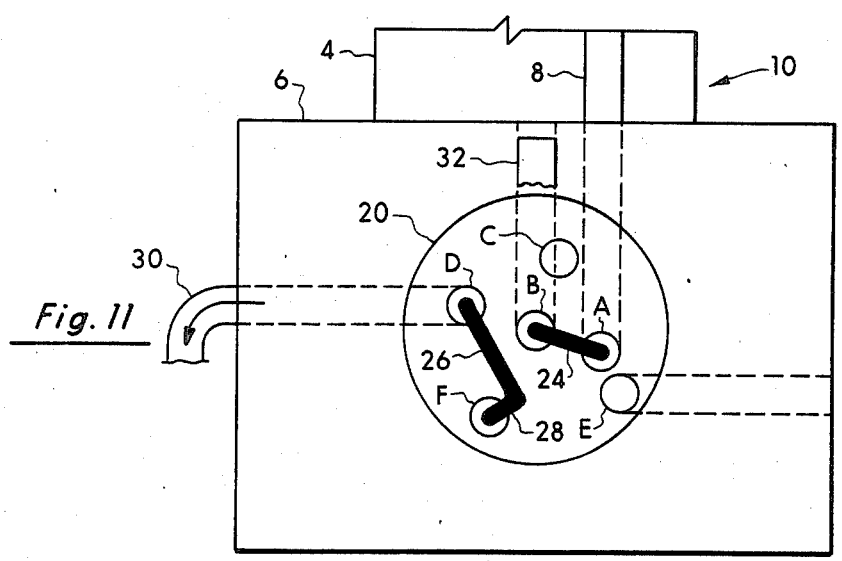
FIG. 11 illustrates the apparatus set to back flush portions of the primary flow to clean the storage container for the liquid herbicides and pesticides and to clean the line leading to it.
Figure 12:
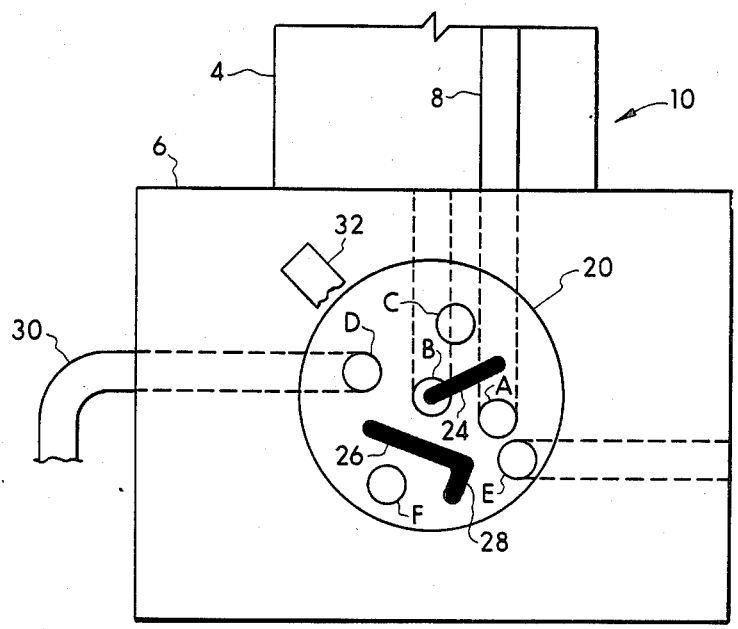
FIG. 12 illustrates the apparatus set in an off position.

In this manner of operation, the measuring chamber 4 can be selectively and alternately loaded and unloaded in a batching mode. However, the control valve member 20 can also be manipulated to the position of FIG. 10 to directly and continuously draw concentrated liquid chemical directly into the primary flow in line 19 from the remote storage container 1 through a fifth flow path of line 30, D, valve passage 26, and line C. Further, the valve member 20 can be turned to a flushing mode (FIG. 11) to back flush water from the primary flow in line 19 into line 30 and storage container 1 through a sixth flow path of line F, valve passages 28, 26, line D, and line 30. Preferably, this back flushed water is then again drawn through the apparatus 2 by turning the valve member 20 to the direct feed position of FIG. 10. In this manner, the contaminated rinse water never leaves the system to expose the operator to the potentially harmful effects of the chemical. When not in use or when desired, the control valve 20 can be moved to the off position of FIG. 12 in which the valve flow passages 24, 26, and 28 do not interconnect any of the lines A-F. Also, as shown in FIGS. 5 and 6, line C preferably has a check valve 48 in it so that fluid from the primary flow in line 19 will never back flow into line C. Without the check valve 48, such fluid might back flow into line C and possibly damage the apparatus 2 or spill chemicals. This could happen if, for example, the operator monitoring the filling of tank 9 turned off the valve 17 (see FIG. 3) when the tank 9 was full. This closing of valve 17 with the pump 5 still on would then stop the flow through the venturi 22 and back fill the line C with high pressure primary flow if the check valve 48 were not present.

Figure 13:
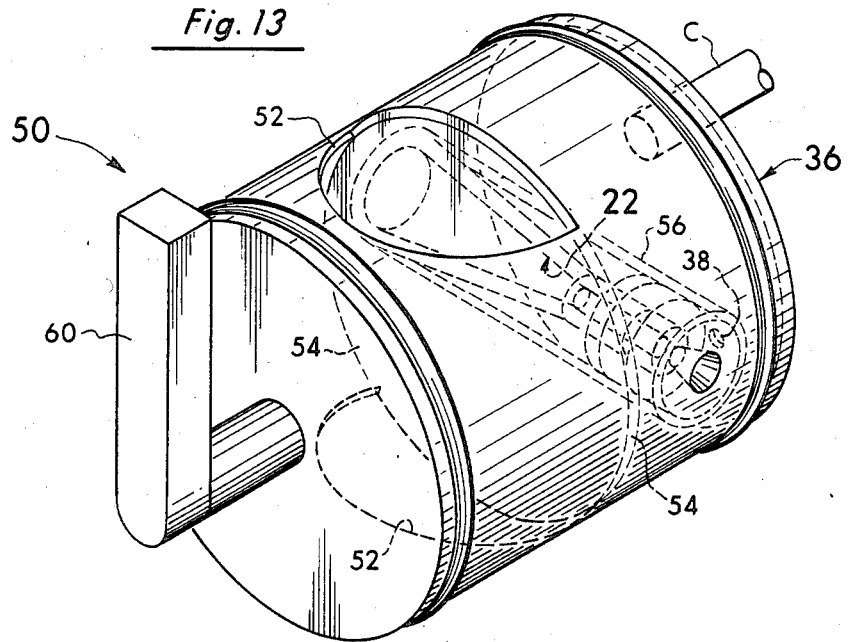
FIG. 13 is a perspective view of the venturi valve in the primary flow.
Figure 14:
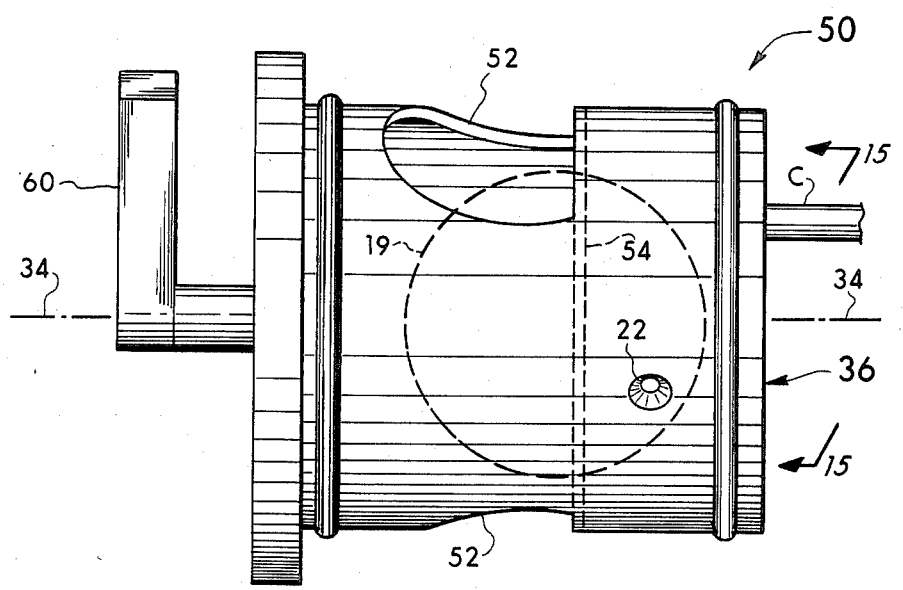
FIG. 14 is a view of the venturi valve similar to the view of FIG. 5 but with the venturi valve rotated to a position to decrease the vacuum draw of the venturi.
Figure 15:
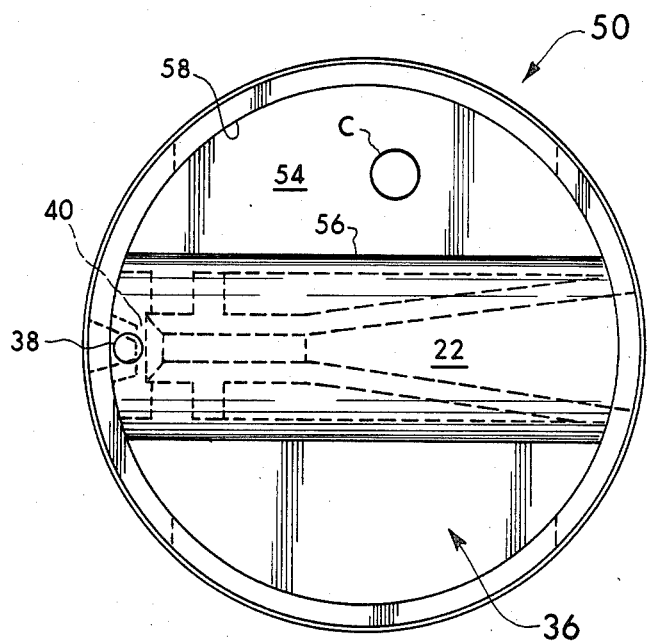
FIG. 15 is a view taken along line 15—15 of FIGS. 5 and 14 illustrating the positioning of the venturi in the venturi valve.

Referring now to the venturi valve 50 in the main flow line 19 (see FIGS. 5, 6, and 13-15), this valve 50 has the venturi 22 mounted in it as well as a bypass channel 52 through it (see FIGS. 13 and 14). The bypass channel 52 and venturi 22 are separated by the wall 54 dividing the bypass channel 52 from the open-ended, cylindrical chamber 36. The venturi 22 is preferably positioned in a tube 56 mounted to extend across the chamber 36 (see FIG. 15) with the chamber 36 then exposed to the reduced pressure of the venturi 22 through port holes 38 and 40. Line C in turn connects with the open end of the chamber 36 inside the inner diameter surface so that no matter where the valve 50 is rotated by the handle 60 about the axis 34, the venturi 22 will always draw a vacuum in line C.

The strength of the venturi 22 can be varied by manipulating the valve 50 from the full venturi position of FIG. 5 in which all of the primary flow in line 19 passes through the venturi 22 to a modified one such as in FIG. 14. In the position of FIG. 14, part of the primary flow through line 19 passes through the venturi 22 and part bypasses it and flows through the channel 52. In an extreme position, the venturi valve 50 can be moved so that all of the primary flow passes through the channel 52 and totally bypasses the venturi 22. This would essentially turn off the apparatus 2; however, the apparatus 2 can also be turned off by simply manipulating the control valve member 20 about the axis 34 to the position of FIG. 12.

As discussed above, one of the principal advantages of the present invention is that once the venturi valve 50 is set to draw the desired vacuum, all of the operations of the apparatus 2 can be accomplished by the simple manipulation of the single valve member 20. Further, as shown in the drawings, a maximum of functions can be performed with a minimum of structure wherein many of the flow lines share common portions. For example, the first flow path of C, 26, A, and 8, the third flow path of C, 24 and B, and the fifth flow path of 30, D, 26, C, share the common portion of C. Similarly, the second flow path of 30, D, 24 and B and third flow path of C, 24, B share the common portion 24 and B wherein the liquid chemicals enter and leave the lower portion 10 of the chamber 4 through this same portion 24 and B.

Figure 16:
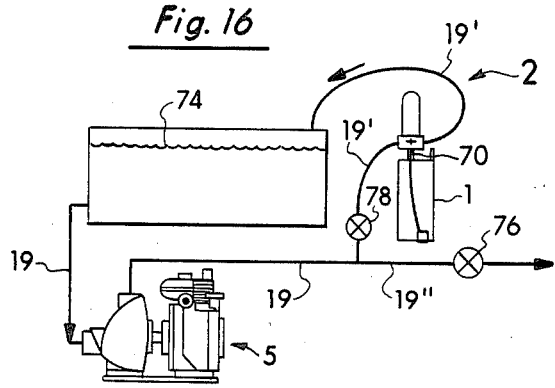
FIG. 16 is a schematic view of the present invention adapted for use in a recirculating system.
Figure 17:
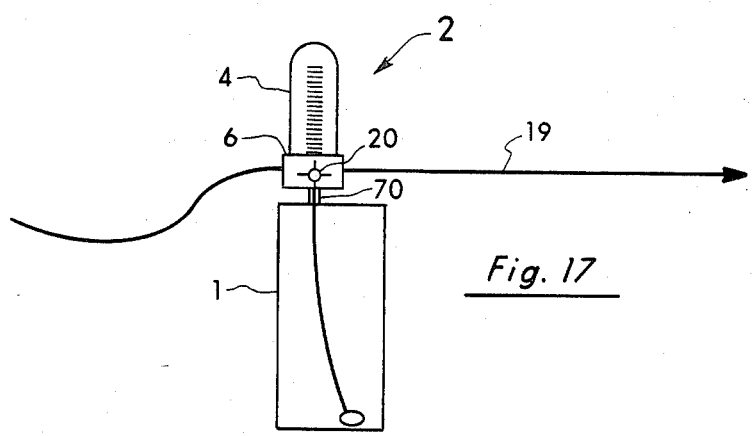
FIG. 17 illustrates the present invention adapted for direct connection to the storage container.
Figure 18:
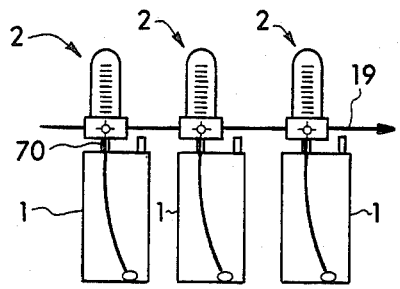
FIG. 18 illustrates the present invention in use in series with a plurality of separate storage containers.
Figure 19:
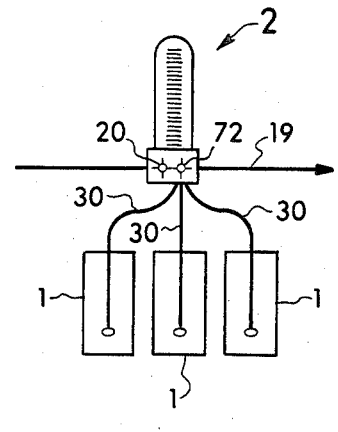
FIG. 19 illustrates the present invention in use with a plurality of storage containers connected in parallel.

FIGS. 16-19 illustrate adaptations of the present invention to other arrangements in which liquid chemicals from remote storage containers 1 are mixed with air or liquid flowing through a main conduit 19. In the arrangement of FIGS. 16-18, the line 30 from the remote storage container or containers 1 in the preferred embodiment of FIGS. 3-15 is replaced by a barrel bung 70. Additionally, the outlet of the line D from the manifold 6 is moved from the side to the bottom of the manifold 6. Other than that, the operation of the apparatus 2 is the same. The arrangement of FIG. 19 varies from the preferred embodiment of FIGS. 3-15 in that plural lines 30 are connected to line D and an additional valve 72 is used to selectively connect one or more of the lines 30 to the line D. In this manner, the liquid chemicals in any or all of the three storage containers 1 of FIG. 19 can be individually or simultaneously added to the primary flow in conduit 19. The arrangement of FIG. 19 essentially has the capacity to add the liquid chemicals from the containers 1 in parallel while the arrangement of FIG. 18 can add the liquid chemicals from the remote storage containers 1 in series. FIG. 16 shows a slight modification in which the desired chemical concentration is first established in the reservoir 74 by circulating the flow through the lines 19 and 19' with valve 76 closed and valve 78 opened. Then, once the desired concentration is obtained in the reservoir 74, valve 76 is opened and valve 78 closed wherein the properly mixed fluid from the reservoir 74 is pumped through lines 19 and 19" to the desired location.

Although several embodiments of the present invention have been shown and described in detail, it is understood that various changes and modifications could be made to them without departing from the scope of the invention.

We claim:

1. A method for selectively using a primary flow of fluid through a conduit to first fill a chamber with a liquid from a remote storage container and then to empty the liquid from said chamber into said primary flow, said chamber having upper and lower portions and said method including the steps of:
   (a) establishing said primary flow of fluid through said conduit from a first location to a second location,
   (b) creating an area of reduced flow pressure in said primary flow at an intermediate location along said conduit between said first and second locations, said reduced flow pressure being less than ambient air pressure,
   (c) providing a first flow path between said area of reduced flow pressure and the upper portion of said chamber,
   (d) providing a second flow path from said remote storage container of liquid to the lower portion of said chamber,
   (e) providing a third flow path between said area of reduced flow pressure and the lower portion of said chamber,
   (f) providing a fourth flow path from air at ambient air pressure to the upper portion of said chamber, and
   (g) selectively (1) opening the first and second flow paths and closing the third and fourth flow paths to reduce the pressure in the chamber below ambient air pressure to draw liquid from said remote storage container through the second flow path into the chamber through the lower portion thereof and then (2) closing the first and second flow paths and opening the third and fourth flow paths to draw liquid from the chamber through the lower portion thereof into the primary flow through the third flow path as air at ambient air pressure fills the upper portion of the chamber through the fourth flow path.

2. The method of claim 1 further including the steps of:
   (h) providing a fifth flow path from said remote storage container of liquid to said area of reduced flow pressure and
   (i) closing said first, second, third, and fourth flow paths and opening said fifth flow path to directly and continuously draw liquid from said remote storage container into said primary flow.

3. The method of claim 2 further including the steps of:
   (j) providing a sixth flow path between said primary flow and said remote storage container and
   (k) selectively directing a portion of said primary flow through said sixth flow path to said remote storage container to flush out said sixth flow path and said remote storage container with primary flow.

4. The method of 3 claim further including the steps of:
   (1) closing said first, second, third, fourth, and sixth flow paths to draw said portion of said primary flow used to flush in step (k) back into the primary flow in said conduit through the fifth flow path.

5. The method of claim 3 wherein said fifth and sixth flow paths have a common portion.

6. The method of claim 3 wherein said first, third, and fifth flow paths have a common portion.

7. The method of claim 2 further including the step of providing check valve means for limiting the flow in said first, third, and fifth flow paths to one direction toward said area of reduced pressure.

8. The method of claim 1 further including the step of providing check valve means for limiting the flow in said first and third flow paths to one direction toward said area of reduced pressure.

9. The method of claim 8 further including the steps of:
   (j) providing a valve member with at least three flow passages and
   (k) mounting said valve member for movement among a first position in which two of said three flow passages are respectively part of the first and second flow paths, a second position in which said two of said three flow passages are respectively part of the third and fifth flow paths, and a third position in which the third flow passage is part of the fourth flow path.

10. The method of claim 9 further including the limitation of mounting said valve member for rotation about an axis among said first, second, and third positions.

11. The method of claim 9 wherein two of said three flow passages in said valve member are interconnected.

12. The method of claim 1 further including the steps of:
   (h) providing an additional flow path between said primary flow and said remote storage container and
   (i) selectively directing a portion of said primary flow through said additional flow path to said remote storage container to flush out said additional flow path and said remote storage container with primary flow.

13. The method of claim 12 wherein said second, third, and additional flow paths have a common portion.

14. The method of claim 1 wherein the steps of (g)(1) and (g)(2) are accomplished by manipulation of a single valve member.

15. The method of claim 1 wherein the steps of (g)(1) and (g)(2) are accomplished by rotation of a single valve member about an axis.

16. The method of claim 1 further including the steps of:
(h) providing a valve member with a plurality of flow passages with one of said flow passages selectively being part of said second flow path during step (g)(1) and part of said third flow path during step(g)(2).

17. The method of claim 1 further including the steps of:
(h) providing a valve member with a plurality of flow passages and
(i) mounting said valve member for movement between a first position in which one of said flow passages is part of the second flow path and a second position in which said one flow passage is part of the third flow path.

18. The method of claim 17 further including the limitation of mounting said valve member for rotation about an axis between said first and second positions.

19. The method of claim 1 wherein the area of reduced flow pressure of step (b) is created by a venturi.

20. The method of claim 1 wherein the liquid in the remote storage container is under ambient air pressure.

21. The method of claim 1 wherein said second and third flow paths have a common portion and said method further includes the limitation that said liquid enters the lower portion of said chamber in step (g)(1) and leaves the lower portion of said chamber in step (g)(2) through said common portion of the second and third flow paths.

22. The method of claim 1 wherein said first flow path includes a pipe and said method includes the step of mounting said pipe within said chamber to extend from the lower to the upper portions thereof.

23. The method of claim 22 wherein said pipe has an open end positioned in the upper portion of said chamber and said method includes the further limitations of providing a float valve and mounting said float valve to close the open end of said pipe when the liquid drawn into the chamber in step (g)(1) rises to the level of the open end of said pipe.

24. The method of claim 1 wherein at least portions of said first, second, third, and fourth paths pass through a common manifold member.

25. The method of claim 1 wherein step (a) is accomplished by a pump positioned in said primary flow in said conduit upstream of said area of reduced flow pressure of step (b) wherein said liquid does not pass through said pump.

26. A valving arrangement primarily intended for use to selectively use the force of a primary flow of fluid being transferred through a conduit by a pump from a first location to a second location to first fill a chamber with a liquid from a remote storage container and then to empty the liquid from said chamber into said primary flow, said chamber having upper and lower portions and said flow having an area of reduced flow pressure at an intermediate location along said conduit between said first and second, locations, said reduced flow pressure being less than ambient air pressure, said valving arrangement including:

means for providing a first flow path between said area of reduced flow pressure and the upper portion of said chamber,
means for providing a second flow path from said remote storage container of liquid to the lower portion of said chamber,
means for providing a third flow path between said area of reduced pressure and the lower portion of said chamber,
means for providing a fourth flow path from air at ambient air pressure to the upper portion of said chamber, and
valve means for selectively (1) opening the first and second flow path means and closing the third the fourth flow path means to reduce the pressure in the chamber below ambient air pressure to draw liquid from said remote storage container through the second flow path means into the chamber and then (2) closing the first and second flow path means and opening the third and fourth flow paths means to draw liquid the chamber through the lower portion thereof into the primary flow path through the third flow path means as air at ambient air pressure fills the upper portion of the chamber through the fourth flow path means.

27. The valving arrangement of claim 26 wherein said valve means includes a valve member and means for mounting said valve member for movement between a first position in which said valve member opens the first and second flow path means and closes the third and fourth flow path means and a second position in which said valve member opens the third and fourth flow path means and closes the first and second flow path means.

28. The valving arrangement of claim 27 further including means for providing a fifth flow path from said remote storage container of liquid to said area of reduced flow pressure and said mounting means mounts said valve member for movement among said first position, said second position, and a third position in which said valve member closes the first, second, third, and fourth flow path means and opens said fifth flow path means to directly and continuously draw liquid from said remote storage container into said primary flow.

29. The valving arrangement of claim 28 further including means for providing a sixth flow path from said primary flow to said remote storage container of liquid and said mounting means mounts said valve member for movement among said first, second, and third positions and a fourth position in which a portion of said primary flow is directed through said sixth flow path means to said remote storage container to flush out said sixth flow path means and said remote storage container with primary flow.

30. The valving arrangement of claim 29 wherein said mounting means mounts said valve member for rotation about an axis among said first, second, third and fourth positions.

31. The valving arrangement of claim 28 wherein said mounting means amounts said valve member for rotation about an axis among said first, second and third positions.

32. The valving arrangement of claim 28 further including check valve means for limiting the flow through the first, third, and fifth flow paths to one direction toward the area of reduced pressure.

33. The valving arrangement of claim 27 wherein said mounting means mounts said valve member for rotation about an axis between said first and second positions.

34. The valving arrangement of claim 27 further including means for providing an additional flow path between said primary flow and said remote storage container and said mounting means mounts said valve member for movement among said first and second positions and an additional position in which a portion of said primary flow is directed through said additional flow path means to said remote storage container to flush out said additional flow path means and said remote storage container with primary flow.

35. The valving arrangement of claim 26 wherein said first flow path means includes a pipe and means for mounting said pipe within said chamber to extend from the lower to the upper portions thereof.

36. The valving arrangement of claim 35 wherein said pipe has an open end and means for positioning said open end in the upper portion of said chamber and said valving arrangement further includes a float valve and means for mounting said float valve to close said open end of said pipe when the liquid drawn into the chamber through the second flow path means rises to the level of the open end of said pipe.

37. The valving arrangement of claim 26 wherein said second and third flow path means have a common portion extending from the lower portion of said chamber wherein said liquid enters and leaves the lower portion of said chamber through said common portion.

38. The valving arrangment of claim 26 further including check valve means for limiting the flow through the first and third flow paths to one direction toward the area of reduced pressure.

* * * * *